United States Patent [19]

Simmons

[11] 4,454,669
[45] Jun. 19, 1984

[54] X-RAY AND PHOTOGRAPHIC VIEWER

[76] Inventor: Robert N. Simmons, 1451 East 55th St., Chicago, Ill. 60602

[21] Appl. No.: 322,646

[22] Filed: Nov. 18, 1981

[51] Int. Cl.³ .............................................. G02B 27/04
[52] U.S. Cl. ...................................... 40/361; 40/362; 40/367; 362/97
[58] Field of Search ................. 40/361, 362, 365, 366, 40/367; 362/97, 98, 99

[56] References Cited

U.S. PATENT DOCUMENTS

| | | | |
|---|---|---|---|
| 1,989,454 | 1/1935 | Köster | 40/365 |
| 2,535,243 | 12/1950 | Taylor | 362/97 X |
| 2,760,288 | 8/1956 | Shoenfeld | 40/361 |
| 3,112,887 | 12/1963 | Brou et al. | 362/97 |
| 4,164,822 | 8/1979 | Batton | 40/361 |
| 4,184,194 | 1/1980 | Shofu | 362/97 |

FOREIGN PATENT DOCUMENTS

| | | | |
|---|---|---|---|
| 491473 | 11/1974 | Australia | 40/361 |
| 821433 | 11/1951 | Fed. Rep. of Germany | 40/361 |

Primary Examiner—Robert P. Swiatek
Attorney, Agent, or Firm—Leydig, Voit, Osann, Mayer & Holt

[57] ABSTRACT

A portable, easy to use photographic viewer for use particularly by medical and dental professionals when required. The viewer is light weight and includes a light source, a photographic imaging screen, clip to retain the photographic slides or negatives in position and a support for maintaining the viewer in any desirable position.

7 Claims, 5 Drawing Figures

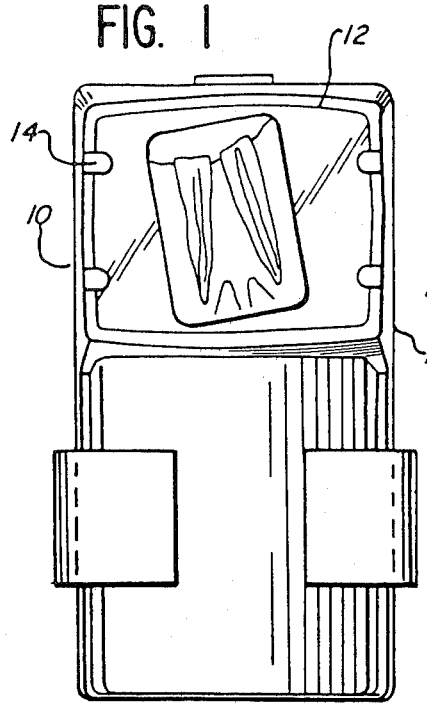
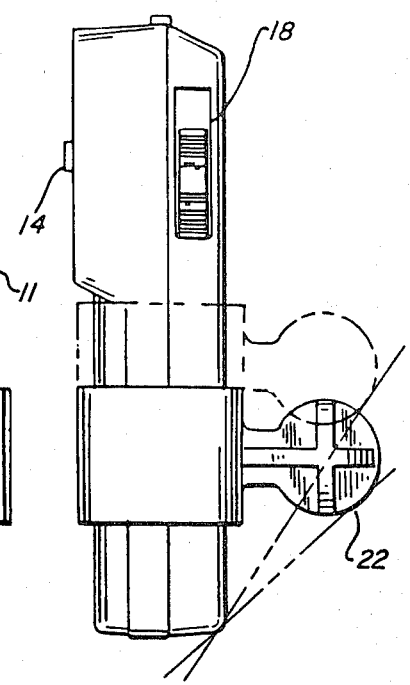
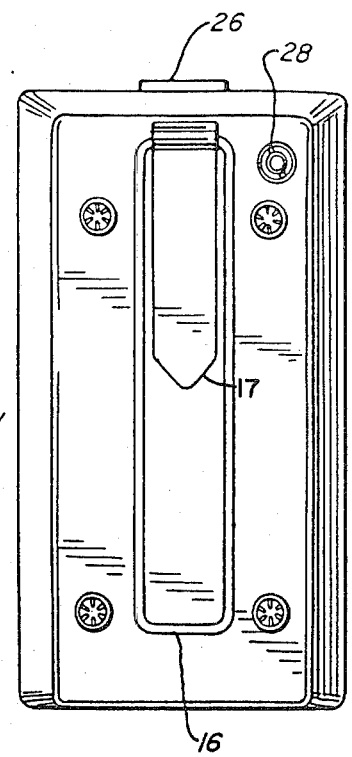
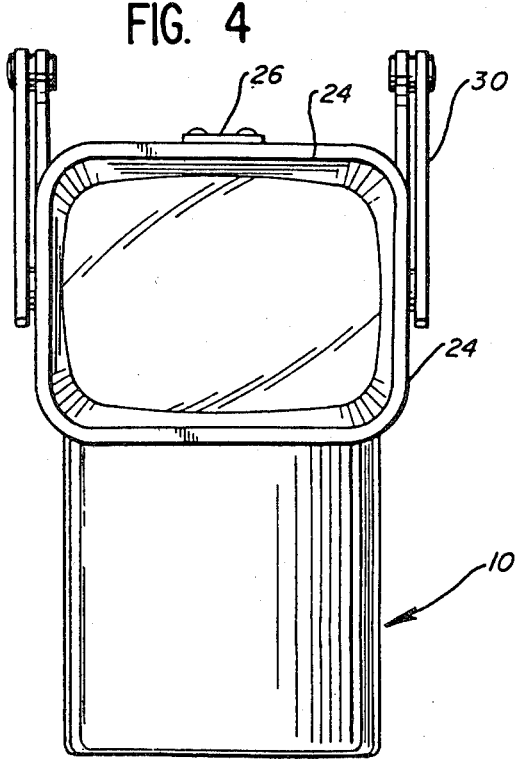
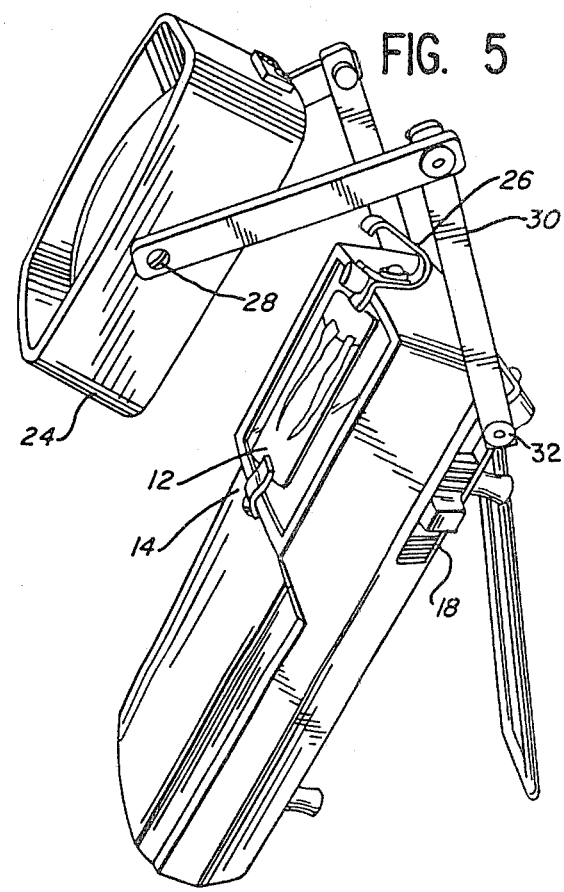

X-RAY AND PHOTOGRAPHIC VIEWER

BACKGROUND OF THE INVENTION

This invention relates to photographic viewers and more particularly to hand held viewers for use by dentists or physicians in all situations.

Since the advent of the age of photography many different devices have been developed to either look at slides or X-rays. All of the devices have suffered from shortcomings.

In the medical and dental profession, it is oftentimes required to observe and study X-rays in emergency situations. Presently, the only method of studying such X-rays, is to have the X-rays illuminated on either a large, bulky photographic tray or to attach the photographic negatives to an illuminated X-ray board. Unfortunately, those existing methods suffer from the inadequacy of not being accessable to the dentist or physician in emergency situations. In addition, due to the size of existing viewers, it is difficult to hold and study X-rays when performing certain medical or dental procedures.

All existing X-rays and photographic viewers suffer one additional shortcoming—each one requires either a constant electrical connection or battery source. Unfortunately, in emergency situations or during certain medical and dental procedures, an electrical source is not always available.

In view of the aforementioned shortcomings, it is an object of this invention to have a viewer for use in emergency situations.

It is further an object of this invention to have a viewer that is portable and easy to use.

It is yet another object of this invention to have a viewer having a long lasting rechargable power source.

It is yet another object of the invention to have a viewer which can be mounted in any convenient location for constant observation during dental and medical procedures.

Other objects and advantages reside in the detailed construction of the invention which is designed for simplicity, economy and efficiency. These will become apparent from the following description.

SUMMARY OF THE INVENTION

In keeping with these objects, there has been developed a portable, easy to use viewer for use by physicians and dentists in emergency and other procedures. The viewer is light weight, and includes a light source, a photographic imaging screen, holding means to retain the photographic slides or negatives in observable position, and support means for maintaining the viewer in any desirable position.

For a better understanding of the present invention, together with other and further objects thereof, reference is directed to the following drawings and detailed description of the preferred embodiment.

BRIEF DESCRIPTION OF DRAWINGS

FIG. 1 is a perspective view of the inventive viewer.

FIG. 2 is a side perspective view of the inventive viewer, and

FIG. 3 is a view of the back of the inventive viewer.

FIG. 4 is a perspective view of an alternate embodiment of the inventive viewer.

FIG. 5 is a side view of the viewer of FIG. 4.

DESCRIPTION OF THE PREFERRED EMBODIMENT

FIG. 1 shows the general characteristics of the viewer 10. The viewer 10 comprises a small body 11 having an imaging screen 12 therein.

The body 11 is made of a light weight plastic material and the imaging screen 12 is of a fluorescent type acrylic material.

The imaging screen 12 is adopted to receive which photographic slides, dental X-rays or miniature X-rays which are positionable thereon, and if desired, they may be secured by retaining means, 14. The retaining means 14 may be clips or other devices under which the the slides or X-rays may be positioned. The retaining means may include an electrical connection such that attachment of the X-ray or slide causes the illumination of the flourescent light source and observance of the X-ray or slide. Obviously, the light source is placed directly behind the imaging screen 12 and may be operated either in response to the placement of an X-ray or slide or by turning the device on at switch 18.

For ease of operation, and as may be observed in FIG. 2, the viewer 10 includes support means 16. The support means 16 may include either a ball joint or lantern mount. The support means 16 may be detached when necessary. When attached, the supporting means 16 can be used for rest support, or for attachment to a dental unit, surgical cabinet or desk. In addition, the viewer 10, may include holding means 17 for attaching the viewer 10 to a wall or other convenient place.

Included within the viewer 10 is a long lasting sealed power cell (not seen). The power cell may be of a rechargable type and therefore a universal adapter 20 is included. Further, as can be seen in FIG. 2, control of the power cell life and fluorescent light source may be controlled by activation of power switch 18.

Size of the viewer 10 is important. It is necessary for the device to be slim and light weight. Further, due to use in medical and dental procedures, the plastic, acrylic and other material from which the viewer is made, must be non-corrosive, non-rusting, non-conductive, and non-breakable.

FIG. 4 discloses an alternate embodiment of the inventive viewer 10. As can be readily observed, this embodiment includes a magnifying lens 24 placed over the imaging screen 12. The magnifying lens 24 is held in place by lens retaining means 26.

In use, the magnifying lens 24 is used to increase the viewing area of photographic slides and X-rays. The magnifying lens 24 while being retained in place through the use of well known methods, i.e. clip 26, is moveable as required through the use of arms 30 attached at pivot 28 attached to the side of the magnifying lens 24 and pivot 32 attached on the side of viewer 10.

To insure use in all medical and dental situations the viewer 10 may include a universal mount 22. Such a mount may be moveable and detachably adjusts to all wanted positions.

In practice such a viewer 10 may be used in almost all situations. It is most practical in emergency medical situations and in dental operations. Due to the size of the viewer 10 it can be hand carried and with a universal mount the viewing position can be adjusted as required.

While the specifics of the viewer 10 have been set forth above, it is obvious to those skilled in the art that changes may be made in the specific embodiment without changing the scope of the invention.

Wherefore, I claim:

1. A portable X-ray and photographic viewer comprising a body having fixed imaging screen upon which an item to be viewed may be placed, a light source disposed behind said imaging screen and within said viewer body, power means contained within said body for permitting selective energization of said light means to illuminate said screen and an item positioned thereon to permit viewing thereof, magnifying means, and support means on said body supporting said magnifying means for adjustable positioning relative to said screen, said support means including linkage between said body and magnifying means and connected closely adjacent said screen to pivotally couple said body and magnifying means for permitting positioning of said magnifying means between an X-ray viewing position in parallel spaced relation to said screen and a travel position directly overlying said screen without movement of said screen relative to said body, and means on said body for positively and releaseably engaging and retaining said magnifying means when located in said travel position.

2. The universal viewer of claim 1 wherein said light source is accuated by a rechargeable power source.

3. The viewer of claim 1 in which said magnifying means is a magnifying lens sized substantially in conformity with said screen.

4. The viewer of claim 3 including means for adjustably supporting said body in an upstanding position during use.

5. The viewer of claim 4 in which said adjustable body supporting means is positionable to a travel position immediately adjacent said body.

6. The viewer of claim 4 in which said adjustable body supporting means is an adjustable mount slidably positionable on the back side of said body.

7. The viewer of claim 4 including clip means for positively retaining an item on said screen when said body is supported in an upstanding position.

* * * * *